United States Patent
Stout, Jr.

(10) Patent No.: US 12,528,004 B2
(45) Date of Patent: Jan. 20, 2026

(54) SYSTEM AND METHOD FOR TRAINING IN A PHYSICAL ACTIVITY

(71) Applicant: New York Institute of Technology, Old Westbury, NY (US)

(72) Inventor: Randy Franklin Stout, Jr., Centerport, NY (US)

(73) Assignee: New York Institute of Technology, Old Westbury, NY (US)

( * ) Notice: Subject to any disclaimer, the term of this patent is extended or adjusted under 35 U.S.C. 154(b) by 222 days.

(21) Appl. No.: 18/477,862

(22) Filed: Sep. 29, 2023

(65) Prior Publication Data

US 2024/0108962 A1 Apr. 4, 2024

Related U.S. Application Data

(60) Provisional application No. 63/412,088, filed on Sep. 30, 2022.

(51) Int. Cl.
| | |
|---|---|
| *A63B 69/32* | (2006.01) |
| *A63B 71/06* | (2006.01) |
| *G06F 3/01* | (2006.01) |
| *G06F 3/0346* | (2013.01) |
| *G06V 10/70* | (2022.01) |

(52) U.S. Cl.
CPC ........ *A63B 69/322* (2022.08); *A63B 71/0622* (2013.01); *G06V 10/70* (2022.01); *A63B 2071/0638* (2013.01); *A63B 2220/40* (2013.01); *A63B 2220/62* (2013.01); *A63B 2220/803* (2013.01); *A63B 2220/836* (2013.01); *A63B 2244/102* (2013.01)

(58) Field of Classification Search
CPC .............. A63B 69/322; A63B 71/0622; A63B 2071/0638; A63B 2220/40; A63B 2220/62; A63B 2220/803; A63B 2220/836; A63B 2244/102; G06V 10/70; G06F 3/011; G06F 3/0346; G06T 19/006
See application file for complete search history.

(56) References Cited

U.S. PATENT DOCUMENTS

| | | | |
|---|---|---|---|
| 2010/0095249 A1* | 4/2010 | Yoshikawa | A63F 13/577 345/419 |
| 2025/0050189 A1* | 2/2025 | Morin | G06T 13/40 |

FOREIGN PATENT DOCUMENTS

| | | | | |
|---|---|---|---|---|
| KR | 101738870 B1 * | 5/2017 | | A63F 13/65 |
| WO | WO-2023076128 A1 * | 5/2023 | | A63F 13/833 |

OTHER PUBLICATIONS

English translation of KR 101738870 B1 (Year: 2017).*

* cited by examiner

*Primary Examiner* — Lixi C Simpson
(74) *Attorney, Agent, or Firm* — Amster, Rothstein & Ebenstein LLP

(57) ABSTRACT

A system for training a user to perform a physical activity includes a control device that obtains movement information associated with a portion of a user's body and provides image information to a display device that displays an image associated with the portion of the user's body with a second image associated with a first target that is associated with physics information associated with simulated physical characteristics of the first target and a third image associated with a second target. The control device controls movement of the first image relative to the second image and the second image relative to the third image based on the movement information and the physics information.

39 Claims, 14 Drawing Sheets

S1010 — Determining, by the control device 102, a first relative position of the first image relative to the second image as the first image moves on the display device 106

S1012 — in the case where the first relative position of the first image overlaps the second image, generating, by the control device 102 second acceleration information associated with the first target indicating movement of the first image away from the second image based on the motion information and the physics information S1014 — Providing, by the control device 102 to the display device 106, the second acceleration information such that the second image moves away from the first image in accordance with the second acceleration information S1016 — Determining, by the control device 102, a second relative position of the second image relative to the third image

FIG. 2B

S2010 Determining, by the control device 202, a first relative position of the first image relative to the second image as the first image moves on the display device 206

S2012 In the case where the first relative position of the first image overlaps the second image, generating, by the control device 102 second acceleration information associated with the first target indicating movement of the first image away from the second image based on the motion information and the physics information

S2014 Providing, by the control device 202 to the display device 206, the second acceleration information such that the second image moves away from the first image in accordance with the second acceleration information

S1016 Determining, by the control device 102, a second relative position of the second image relative to the third image

FIG. 5B

SYSTEM AND METHOD FOR TRAINING IN A PHYSICAL ACTIVITY

CROSS-REFERENCE TO RELATED APPLICATIONS

The present application claims benefit of and priority to U.S. Provisional Patent Application No. 63/412,088 filed Sep. 30, 2022 entitled SYSTEM AND METHOD FOR TRAINING IN A PHYSICAL ACTIVITY, the entire content of which is incorporated by reference herein.

FIELD OF THE DISCLOSURE

The present invention relates to a system and method for training a user for a physical activity. In particular, the present inventions related to a system and method.

RELATED ART

Virtual reality systems are increasingly being used in a variety of applications. Such systems allow user's to immerse themselves in an alternate reality in virtually any desired virtual environment. The immersive experience provided by virtual reality increases user enjoyment and provide an experience that goes well beyond traditional gaming. Conventional virtual reality systems are very effective at enhancing the gaming experience by immersing the user in a different, virtual world, however, conventional virtual reality systems suffer from an inherent technical shortcoming in that the skills and experiences developed using such virtual reality programs are limited to the virtual world. As such, conventional virtual reality systems do not allow for learning and improving skills that are applicable to the real world. While useful, contemporary virtual reality training programs suffer from certain technical deficiencies which limit their usefulness for training for real world activities. That is, conventional virtual reality systems develop skills and experience that are helpful in the virtual world, but do not apply to the real world or any activities performed therein. That is, conventional virtual reality systems do not allow for the development or improvement of skills used in the real world. Indeed, to the contrary, users of conventional virtual reality systems often develop improper skills that are useful in a gaming environment but teach improper technique or form for activities performed in real life. Thus, the shortcomings inherent to conventional virtual reality systems prevent the use of such systems for training and rehabilitation.

Accordingly, it would be beneficial to provide a virtual reality system and method for use in training a user to perform a physical activity that avoids these and other problems.

SUMMARY

It is an object of the present disclosure to provide a method and system for using virtual reality to train a user to perform a physical activity, such as boxing. In embodiments the method and system provides for virtual targets that are associated with physical characteristics and move relative to each other based on these physical characteristics such that users train using targets with a simulated physical presence and thus learn proper form and appropriate exertion that may be used in real life.

A system for training a user to participate in a physical activity in accordance with an embodiment of the present disclosure includes: a control device including: one or more processors; and memory operatively connected to the one or more processors; a first input device operably connected to the control device and configured to provide movement information associated with the first input device as the user participates in the physical activity, wherein the movement information includes: first position information associated with a current position of the first input device; first acceleration information associated with movement of the first input device from the current position, wherein the first acceleration information includes: first speed information associated with a first speed of movement of the first input device; and first direction information associated with a first direction of movement of the first input device; a display device operably connected to the control device and operable to display one or more images; wherein the memory in the control device includes processor executable code that when executed by the one or more processors executes steps of obtaining, by the control device from the first input device, the movement information; generating, by the control device, first image information associated with the first input device based at least on the movement information; generating, by the control device, second image information associated with a first target, wherein the second image information includes second position information indicating a second position of the first target; and physics information associated with simulated physical properties of the first target; generating, by the control device, third image information associated with a second target, wherein the third image information includes: third position information associated with a third position of the second target in three dimensional space, wherein the third position information is generated to position the second target at a desired position. providing, by the control device to the display device, the first image information, the second image information and the third image information such that: a first image associated with the input device and based on the first image information is provided on the display device, wherein the first image moves based on the acceleration information; a second image associated with the first target is provided on the display device based on the second image information; a third image associated with the second target is provided on the display device based on the third image information; determining, by the control device, a first relative position of the first image relative to the second image as the first image moves on the display device; in the case where the first relative position of the first image overlaps the second image, generating second acceleration information associated with the first target indicating movement of the first image away from the second image on the display device, wherein the second acceleration information is based on the movement information and the physics information and includes: second speed information indicating a second speed at which the first image moves away from the second image; second direction information indicating a second direction in which the first image moves away from the second image; providing, by the control device, the second acceleration information to the display device such that the second image moves away from the first image on the display device; determining, by the control device, a second relative position of the second image relative to the third image; in the case where the second relative position of the second image overlaps the third image, generating, by the control device, a first alert indicating that the second image overlaps the third image; in the case where the second relative position of the second image does not overlap the third image, repeating steps for a first period of time, and when the second relative position of the second image does not overlap the third image during the first period of time, generating a second alert indicating that the second image does not overlap with the third image.

In embodiments, the control device includes a computer.

In embodiments, the control device includes a smart phone.

In embodiments, the control device includes a gaming console.

In embodiments, the control device includes a set top box.

In embodiments, the control device includes an integrated circuit.

In embodiments, the control device includes a microprocessor.

In embodiments, the acceleration information includes orientation information indicating a pitch and yaw of the first input device.

In embodiments, the first input device includes at least one sensor operable to provide the first position information.

In embodiments, the at least one sensor includes an accelerometer.

In embodiments, the at least one sensor includes a gyrometer.

In embodiments, the first input device includes a virtual reality wireless controller.

In embodiments, the first input device includes a wearable device.

In embodiments, the first input device includes a glove.

In embodiments, the control device is integrated into the first input device.

In embodiments, the display device includes a virtual reality headset.

In embodiments, the display device includes a heads up display device.

In embodiments, the display device includes wearable glasses.

In embodiments, the display device communicates with the control device via a wireless connection.

In embodiments, the display device communicates with the control device via a wired connection.

In embodiments, the control device is integrated into the display device.

In embodiments, the physics information includes simulated mass information associated with a simulated mass of the first target.

In embodiments, the physics information includes simulated friction information associated with simulated friction of the first target.

In embodiments, the physical information includes simulated spring tension information associated with a resiliency of a spring associated with the first target.

In embodiments, the physics information includes simulated inertia information associated with inertia of the first target.

In embodiments, the physics information includes simulated gravity information associated with gravity of the first target.

In embodiments, the physics information includes simulated hardness information associated with a hardness of the first target.

In embodiments, the physics information includes duration information associated with a period of time that the first target is displayed.

In embodiments, the physics information includes size information associated with a size of the first target.

In embodiments, the physics information includes color information associated with a color of the first target.

In embodiments, the processor executable code includes instructions that when executed by the one or more processors perform a step of generating the physics information.

In embodiments, the processor executable code includes instructions that when executed by the one or more processors perform a step of obtaining the physics information from memory.

In embodiments, the processor executable code includes instructions that when executed by the one or more processors executes a step of receiving the physics information via an input element operably connected to the control device.

In embodiments, the physics information is modified based on user input.

In embodiments, the second position information includes second target distance information associated with a predetermined distance and the desired position is the predetermined distance from the first target.

In embodiments, the second position information includes second target distance information associated with a predetermined distance and the second position information is generated such that the desired position is the predetermined distance from the first target.

In embodiments, the second target distance information is provided by a user.

In embodiments, the second position information is associated with a second target point in three dimensional space.

In embodiments, the first image information is used to generate the first image at a first position in three dimensional space.

In embodiments, the second image information is used to generate the second image at a second position in three dimensional space.

In embodiments, the first image and the second image are provided on the display device concurrently.

In embodiments, the third image information is used to generate the third image at a third position in three dimensional space.

In embodiments, the first image, the second image and the third image are provided on the display device concurrently.

In embodiments, the processor executable code includes instructions that when executed by the one or more processors generate an audible cue when the first relative position of the first image overlaps the second image.

In embodiments, the first alert is visual.

In embodiments, the first alert is audible.

In embodiments, the first alert includes a first time stamp indicating a time at which the second image overlapped the third image.

In embodiments, the memory includes processor executable code that when executed by the one or more processors perform a step of recording, by the control device, the first alert and the first time stamp in the memory.

In embodiments, the memory includes processor executable code that when executed by the one or more processors performs a step of determining, by the control device, a number of times the second image overlaps the third image during a second period of time.

In embodiments, the memory includes processor executable code that when executed by the one or more processors performs a step of in the case where the number of times the second image overlaps the third image during the first period of time exceeds a first threshold, updating the physics information associated with the first target.

In embodiments, the simulated friction information is updated to increase friction of the first target.

In embodiments, the simulated mass information is updated to increase the simulated mass of the first target.

In embodiments, the simulated spring tension information is updated to increase the tension.

In embodiments, the simulated inertia information is updated to increase inertia of the first target.

In embodiments, the simulated gravity information is increased to increase gravity of the first target.

In embodiments, the simulated hardness information is decreased to lower the hardness of the first target.

In embodiments, the duration information is updated to reduce the period of time that the first target is displayed on the display device.

In embodiments, the step of generating the first alert includes generating a first tag indicating that the second image overlaps the third image.

In embodiments, the second alert is a visual.

In embodiments, the second alert is audible.

In embodiments, the memory includes processor executable code that when executed by the one or more processors performs a step of recording, by the control device, the second alert and the first time stamp in the memory.

In embodiments, the memory includes processor executable code that when executed by the one or more processors performs a step of when the second image does not overlap the third image during the first period of time, updating the physics information associated with the first target.

In embodiments, the simulated friction information is updated to decrease friction of the first target.

In embodiments, the simulated mass information is updated to decrease the simulated mass of the first target.

In embodiments, the simulated spring tension information is updated to decrease the tension.

In embodiments, the simulated inertia information is updated to decrease inertia of the first target.

In embodiments, the simulated gravity information is decreased to decrease gravity of the first target.

In embodiments, the simulated hardness information is increased to increase the hardness of the first target.

In embodiments, the duration information is updated to increase the period of time that the first target is displayed on the display device.

In embodiments, the step of updating the physics information includes using artificial intelligence.

In embodiments, the memory includes processor executable code that when executed by the one or more processor performs steps of: generating, by the control system, a training set based on the first tag, the second tag, the first image information, the second image information, the third image information, the physics information, the acceleration information and the movement information; and training a machine learning algorithm using the training set, wherein the step of updating the physics information is performed in accordance with the machine learning algorithm.

In embodiments, the step of generating the second alert includes generating a second tag indicating that the second image does not overlap the third image.

In embodiments, the memory includes processor executable code that when executed by the one or more processors executes steps of: obtaining, by the control device, user identification information associated with a first user associated with the first input device; storing, by the control device, the user identification information in the memory; generating, by the control device in the memory, session time information associated with a second period of time that the user uses the first control device; storing, by the control device in the memory, the session time information and associating the session time information with the user information; storing, by the control device in the memory, the movement information and the second acceleration information and associating the movement information and the second acceleration information with the user identification information.

In embodiments, the memory includes processor executable code that when executed by the one or more processors executes a step of storing, by the control device in the memory, at least one of the first tag and the second tag with the user identification information.

A system for training a user to participate in a physical activity in accordance with another embodiment of the present disclosure includes: a control device including: one or more processors; and memory operatively connected to the one or more processors; a sensor device operably connected to the control device and configured to provide movement information associated with a portion of a body of a user as the user participates in the physical activity, wherein the movement information includes: first position information associated with a current position of the portion of the body of the user; first acceleration information associated with movement of the portion of the body of the first user the current position, wherein the first acceleration information includes: first speed information associated with a first speed of movement of the portion of the body; and first direction information associated with a first direction of movement of the portion of the body; a display device operably connected to the control device and operable to display one or more images; wherein the memory in the control device includes processor executable code that when executed by the one or more processors executes steps of: obtaining, by the control device from the sensor device, the movement information; generating, by the control device, first image information associated with the first portion of the user based at least on the movement information; generating, by the control device, second image information associated with a first target, wherein the second image information includes: second position information indicating a second position of the first target; and physics information associated with simulated physical properties of the first target; generating, by the control device, third image information associated with a second target, wherein the third image information includes: third position information associated with a second position of the second target in three dimensional space, wherein the second target position information is generated to position the second target at a desired position; providing, by the control device to the display device, the first image information, the second image information and the third image information such that: a first image associated with the input device and based on the first image information is provided on the display device, wherein the first image moves based on the acceleration information; a second image associated with the first target is provided on the display device based on the second image information; and a third image associated with the second target is provided on the display device based on the third image information; determining, by the control device, a first relative position of the first image relative to the second image as the first image moves on the display device; in the case where the first relative position of the first image overlaps the second image, generating second acceleration information associated with the first target indicating movement of the second image away from the first image on the display device, wherein the second acceleration information is based on the movement information and the physics information and includes: second speed information indicating a second speed at which the second image moves away from the first image; second direction information indicating a second direction in which the second image moves away from the second image; providing, by the control device, the second acceleration information to the display device such that the second image moves away from the first image on the display device; determining, by the control device, a second relative position of the second image relative to the third image; in the case where the second relative position of the second image overlaps the third image, generating, by the control device, a first alert indicating that the second image overlaps the third image; in the case where the second relative position of the second image does not overlap third image, repeating steps for a first period of time, and when the second relative position of the second image does not overlap the third image during the first period of time, generating a second alert indicating that the second image does not overlap with the third image.

In embodiments, the control device includes a computer.

In embodiments, the control device includes a smart phone.

In embodiments, the control device includes a gaming console.

In embodiments, the control device includes a set top box.

In embodiments, the control device includes an integrated circuit.

In embodiments, the control device includes a microprocessor.

In embodiments, the acceleration information includes orientation information indicating a pitch and yaw of the portion of the body.

In embodiments, the sensor device includes a camera configured to provide user image information associated with at least the portion of the body and the position information and the acceleration information are provided based on the user image information.

In embodiments, the sensor device includes at least one infrared source associated with the portion of the body and at least one infrared sensor providing infrared detection information associated with the portion of the body.

In embodiments, the position information and the acceleration information are based on the user image information and the infrared detection information.

In embodiments, the at least one infrared sensor includes a camera.

In embodiments, the at least one infrared sensor is separate from the camera.

In embodiments, the sensor device includes a first camera and a second camera configured to provide first user image information and second user image information, respectively, associated with at least the portion of the body and the position information and the acceleration information are provided based on the first user image information and the second user image information.

In embodiments, the sensor device further includes at least one infrared source associated with the portion of the body and at least one infrared sensor providing infrared detection information associated with the portion of the body.

In embodiments, the position information and the acceleration information are based on the first user image information, the second user image information and the infrared detection information.

In embodiments, the at least one infrared sensor includes at least one of the first camera and the second camera.

In embodiments, the at least one infrared sensor is separate from the first camera and the second camera.

In embodiments, the sensor device includes a first infrared source associated with the portion of the user's body and at least one infrared sensor providing infrared detection information associated with the portion of the body.

In embodiments, the position information and the acceleration information are based on the infrared detection information.

In embodiments, the at least one infrared sensor includes a first camera.

In embodiments, the at least one infrared sensor is separate from the first camera.

In embodiments, the sensor device includes a LIDAR system providing the position information and acceleration information are based on LIDAR information provided by the LIDAR system.

In embodiments, the LIDAR system includes: an electromagnetic source configured to direct electromagnetic radiation toward a surface associate with the portion of the user; and an electromagnetic receiver device configured to detect electromagnetic radiation received from the surface associated with the portion of the user and provide the LIDAR information.

In embodiments, the sensor device includes a gyroscopic movement sensor configured to provide gyroscopic information associated with the portion of the body and the position information and the acceleration information are based on gyroscopic information.

In embodiments, the sensor device includes one or more electromagnetic field sensors providing electromagnetic field information associated with the portion of the body and the position information and the acceleration information are based on the electromagnetic field information.

In embodiments, the one or more electronic field sensors include wearable inductance sensors.

In embodiments, the sensor device includes one or more force plates provided on a floor and configured to provide weight information associated with the user's body and the position information and acceleration information are based on at least the weight information.

In embodiments, the sensor device includes at least one of a camera providing user image information associated with the portion of the user, an infrared detector providing infrared detection information associated with the portion of the body, a LIDAR system providing LIDAR information associated with the portion of the user, a gyroscopic sensor providing gyroscopic information associated with the portion of the user, an electromagnetic field sensor providing electromagnetic field information associated with the portion of the body and at least one force plate providing weight information associated with the portion of the body, wherein the position information and acceleration information are based on one or more of the user image information, the infrared detection information, the LIDAR information, the gyroscopic information, the electromagnetic field information and the weight information.

In embodiments, the display device includes a virtual reality headset.

In embodiments, the camera is provided in a virtual reality headset.

In embodiments, the first camera and the second camera are provided in a virtual reality headset.

In embodiments, the display device communicates with the control device via a wireless connection.

In embodiments, the display device communicates with the control device via a wired connection.

In embodiments, the control device is integrated into the display device.

In embodiments, the physics information includes simulated mass information associated with a simulated mass of the first target.

In embodiments, the physics information includes simulated friction information associated with a simulated friction of the first target to movement.

In embodiments, the physics information includes duration information associated with a period of time that the first target is displayed.

In embodiments, the physics information includes simulated mass information associated with a simulated mass of the first target.

In embodiments, the physics information includes simulated friction information associated with simulated friction of the first target.

In embodiments, the physics information includes simulated spring tension information associated with a resiliency of a spring associated with the first target.

In embodiments, the physics information includes simulated inertia information associated with simulated inertia of the first target.

In embodiments, the physics information includes simulated gravity information associated with simulated gravity of the first target.

In embodiments, the physics information includes duration information associated with a period of time that the first target is displayed.

In embodiments, the physics information includes size information associated with a size of the first target.

In embodiments, the physics information includes color information associated with a color of the first target.

In embodiments, the memory in the control device includes processor executable code that when executed by the one or more processors executes a step of generating the physics information.

In embodiments, the memory in the control device includes processor executable code that when executed by the one or more processors executes a step of obtaining the physics information from memory.

In embodiments, the memory in the control device includes processor executable code that when executed by the one or more processors executes a step of receiving, the physics information via an input element operably connected to the control device.

In embodiments, the physics information is modified based on user input.

In embodiments, the second position information includes second target distance information associated with a predetermined distance and the desired position is a predetermined distance from the first target.

In embodiments, the second position information includes second target distance information associated with a predetermined distance and the second target position information is generated such that the desired position is the predetermined distance from the first target.

In embodiments, the second target distance information is provided by a user.

In embodiments, the second target position information is associated with a second target point in three dimensional space.

In embodiments, the first image information is used to generate the first image at the first position in three dimensional space.

In embodiments, the second image information is used to generate the second image at a second position in three dimensional space.

In embodiments, the first image and the second image are provided on the display device concurrently.

In embodiments, the third image information is used to generate the third image at a third position in three dimensional space.

In embodiments, the first image, the second image and the third image are provided on the display device concurrently.

In embodiments, the first alert is visual.

In embodiments, the first alert is audible.

In embodiments, the first alert includes a first time stamp indicating a time at which the second image overlapped the third image.

In embodiments, the memory in the control device includes processor executable code that when executed by the one or more processors executes a step of recording, by the control device, the first alert and the first time stamp in the memory.

In embodiments, the memory includes processor executable code that when executed by the one or more processors executes a step of determining, by the control device, a number of times the second image overlaps the second image during a first period of time.

In embodiments, the memory in the control device includes processor executable code that when executed by the one or more processors executes a step of in the case where the number of times the second image overlaps the second image during the first period of time exceeds a first threshold, updating the physics information associated with the first target.

In embodiments, the simulated resiliency information is updated to increase resiliency of the first target.

In embodiments, the simulated mass information is updated to increase the simulated mass of the first target.

In embodiments, the simulated spring tension information is increased to increase the spring tension of the first target.

In embodiments, the duration information is updated to reduce the period of time that the first target is displayed on the display device.

In embodiments, the duration information is updated to reduce the period of time that the first target is displayed on the display device.

In embodiments, the step of generating the first alert includes generating a first tag indicating that the second image overlaps the third image.

In embodiments, the second alert is a visual.

In embodiments, the second alert is audible.

In embodiments, the memory in the control device includes processor executable code that when executed by the one or more processors executes a step of recording, by the control device, the second alert and the first time stamp in the memory.

In embodiments, the memory in the control device includes processor executable code that when executed by the one or more processors executes a step of when the second image does not overlap the third image during the first period of time, updating the physics information associated with the first target.

In embodiments, the simulated resiliency information is updated to decrease resiliency of the first target.

In embodiments, the simulated weight information is updated to decrease the simulated weight of the first target.

In embodiments, the duration information is updated to increase the period of time that the first target is displayed on the display device.

In embodiments, the step of generating the second alert includes generating a second tag indicating that the second image does not overlap the third image.

In embodiments, the memory includes processor executable code that when executed by the one or more processors, executes a step of storing, by the control device in the memory, at least one of the first tag and the second tag the user identification information.

In embodiments, the step of updating the physics information includes using artificial intelligence.

In embodiments, the memory in the control device includes processor executable code that when executed by the one or more processors executes steps of: generating, by the control system, a training set based on the first tag, the second tag, the first image information, the second image information, the third image information, the physics information, the acceleration information and the movement information; and training a machine learning algorithm using the training set, wherein the step of updating the physic information is performed in accordance with the machine learning algorithm.

In embodiments, the memory includes processor executable code that when executed by the one or more processors, executes steps of: obtaining, by the control device, user identification information associated with a first user associated with the first input device; storing, by the control device, the user identification information in the memory; generating, by the control device in the memory, session time information associated with a second period of time that the user uses the first control device; storing, by the control device in the memory, the session time information and associating the session time information with the user information; and storing, by the control device in the memory, the movement information and the second acceleration information and associating the movement information and the second acceleration information with the user identification information.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein:

FIGS. 2A-2D and 3 illustrate exemplary flow charts illustrating a method for training a user to perform a physical activity using the system of FIG. 1 in accordance with an embodiment of the present disclosure;

FIG. 5A-5D illustrate an exemplary flow chart illustrating a method for training a user to perform a physical activity using the system of FIG. 3 in accordance with an embodiment of the present disclosure.

DETAILED DESCRIPTION OF THE EXEMPLARY EMBODIMENTS

In embodiments, the method and system of the present disclosure provides an improved virtual reality system that will enable users to train in a virtual environment to gain and improve skills that will apply in the real world.

Figure 1:
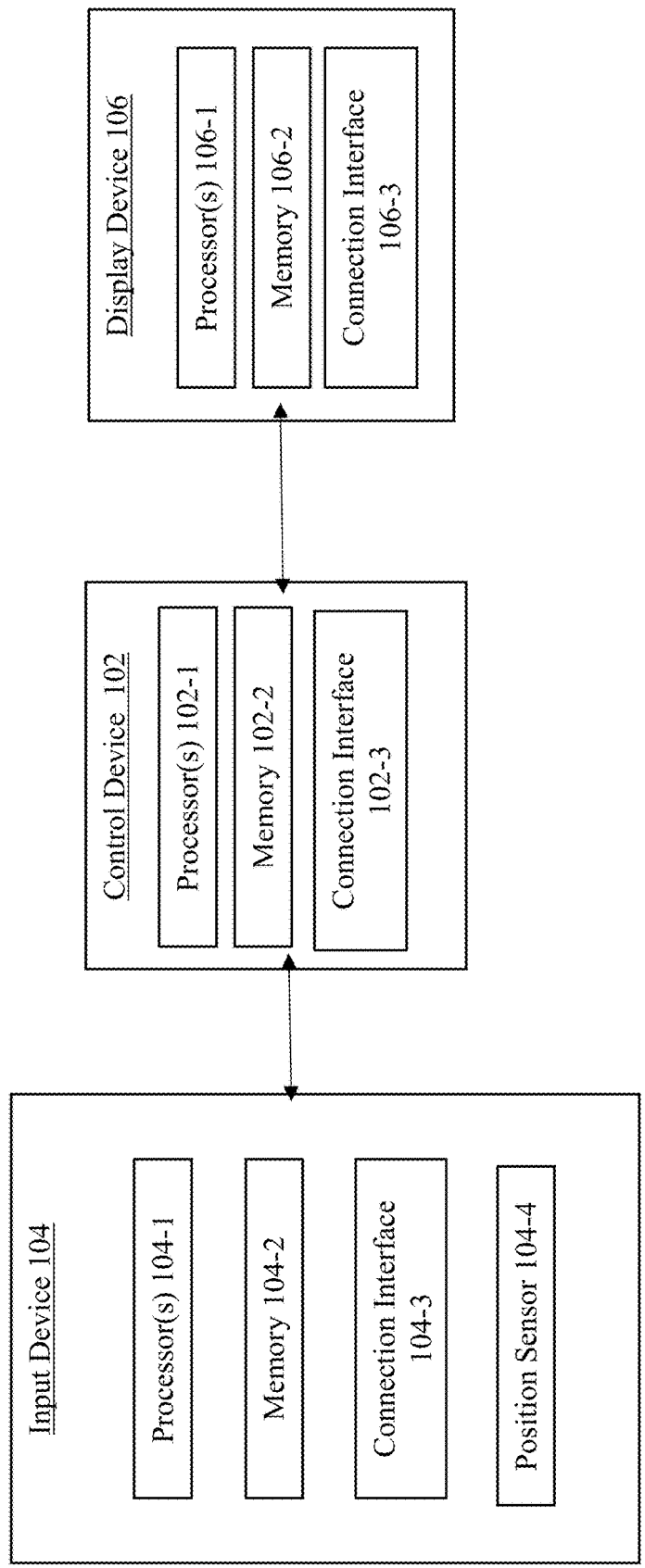
FIG. 1 illustrates an exemplary illustration of a virtual reality system for training a user to perform a physical activity in accordance with an embodiment of the present disclosure.

A virtual reality system 100 for training a user to perform a physical activity in accordance with an embodiment of the present disclosure is illustrated in FIG. 1. In embodiments, the system 100 may include a control device 102 which may be or include a processor 102-1 (or processors) operatively connected to memory 102-2. In embodiments, the control device 102 may be operatively connected to one or more external devices. In embodiments, a connection interface 102-3 may be provided in or operably connected to the control device 102 and may be configured to provide external communication to one or more external devices and/or a network. In embodiments, the memory 102-2 may include computer executable code as well as other data or information.

In embodiments, the control device 102 may be a computer, including but not limited to a desktop computer, laptop computer or server to name a few. In embodiments the control device 102 may be a smart phone, gaming console, set top box, integrated circuit or microprocessor, to name a few. In embodiments, the processor 102-1 may be an integrated circuit, microprocessor or any other logic device.

In embodiments, the system 100 may include an input device 104 operably connected to the control device 102. In embodiments, the input device 104 may be operatively connected to the control device 102 and may be configured to provide movement information associated with movement of the input device. In embodiments, the input device 104 may be held by or manipulated by the user such that movement of the input device corresponds to movement of the user, or at least a portion of the user. In embodiments, the input device 104 may communicate with the control device 102 via a wireless connection. In embodiments, the input device 104 may communicate with the control device 102 via a wired connection. In embodiments, the control device 102 may be integrated into the input device 104. In embodiments, the input device 104 may include a processor (or processors) 104-1 operatively connected to a memory 104-2. In embodiments, the input device 104 may include a connection interface 104-3 which may be configured to provide communication with one or more external devices or networks, including the control device 102, via the connection interface 102-3 of the control device 102, for example.

In embodiments, the movement information may include first position information associated with a current position of the input device 104. In embodiments, the movement information may include acceleration information associated with movement of the first input device 104 from the current position. In embodiments, the acceleration information may include speed information associated with a speed of movement of the input device 104. In embodiments, the acceleration information may include direction information associated with a direction of movement of the first input device. In embodiments, the acceleration information may include orientation information indicating a pitch and yaw of the first input device. In embodiments, the input device 104 may include a position sensor 104-4 configured to provide the position information, including the acceleration information. In embodiments, the position sensor 104-4 may be an accelerometer. In embodiments, the position sensor 104-4 may be a gyrometer.

Figure 1A:
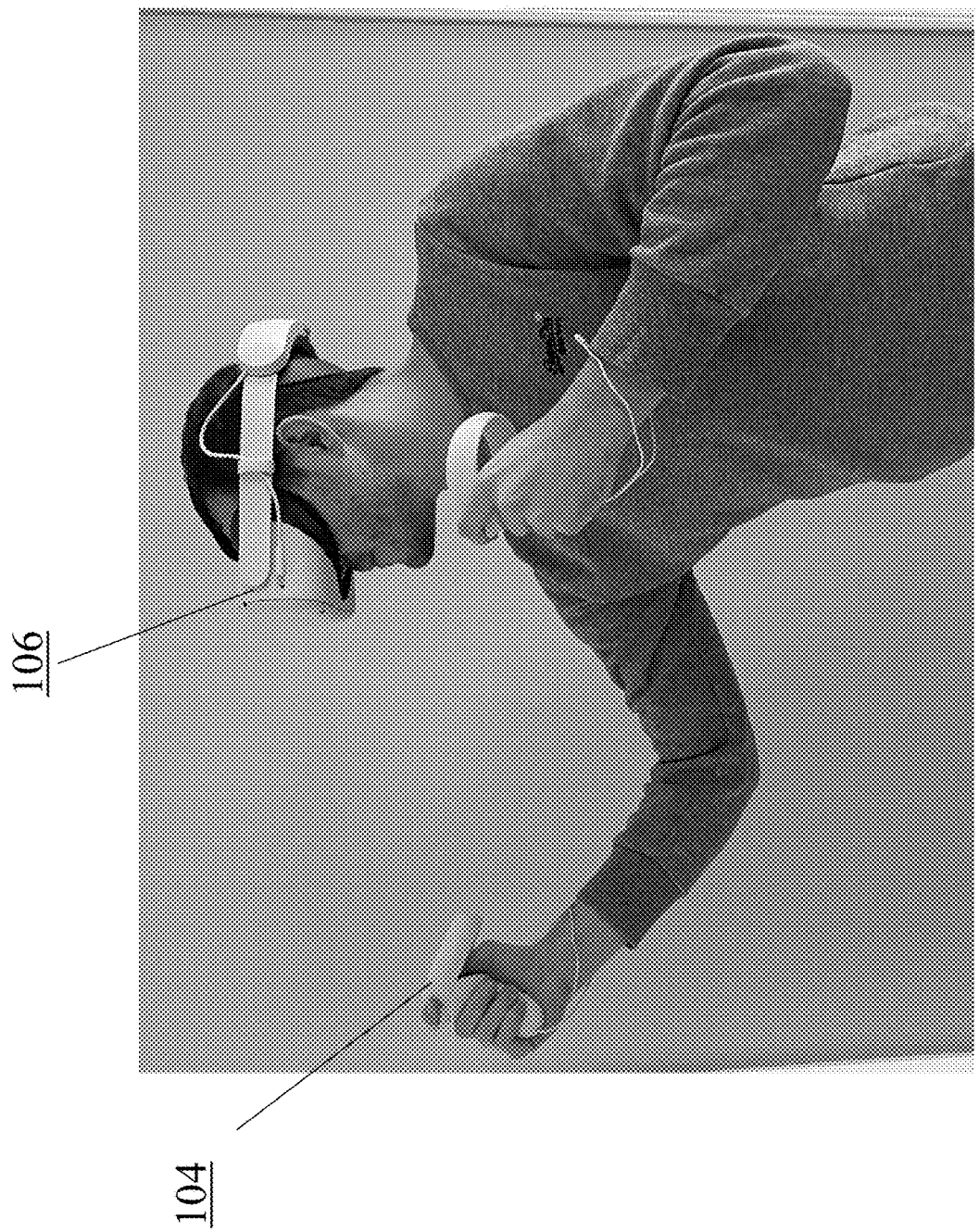
FIG. 1A illustrates an exemplary illustration of a user using a virtual reality system that may be used in the system of FIG. 1.
Figure 2A:
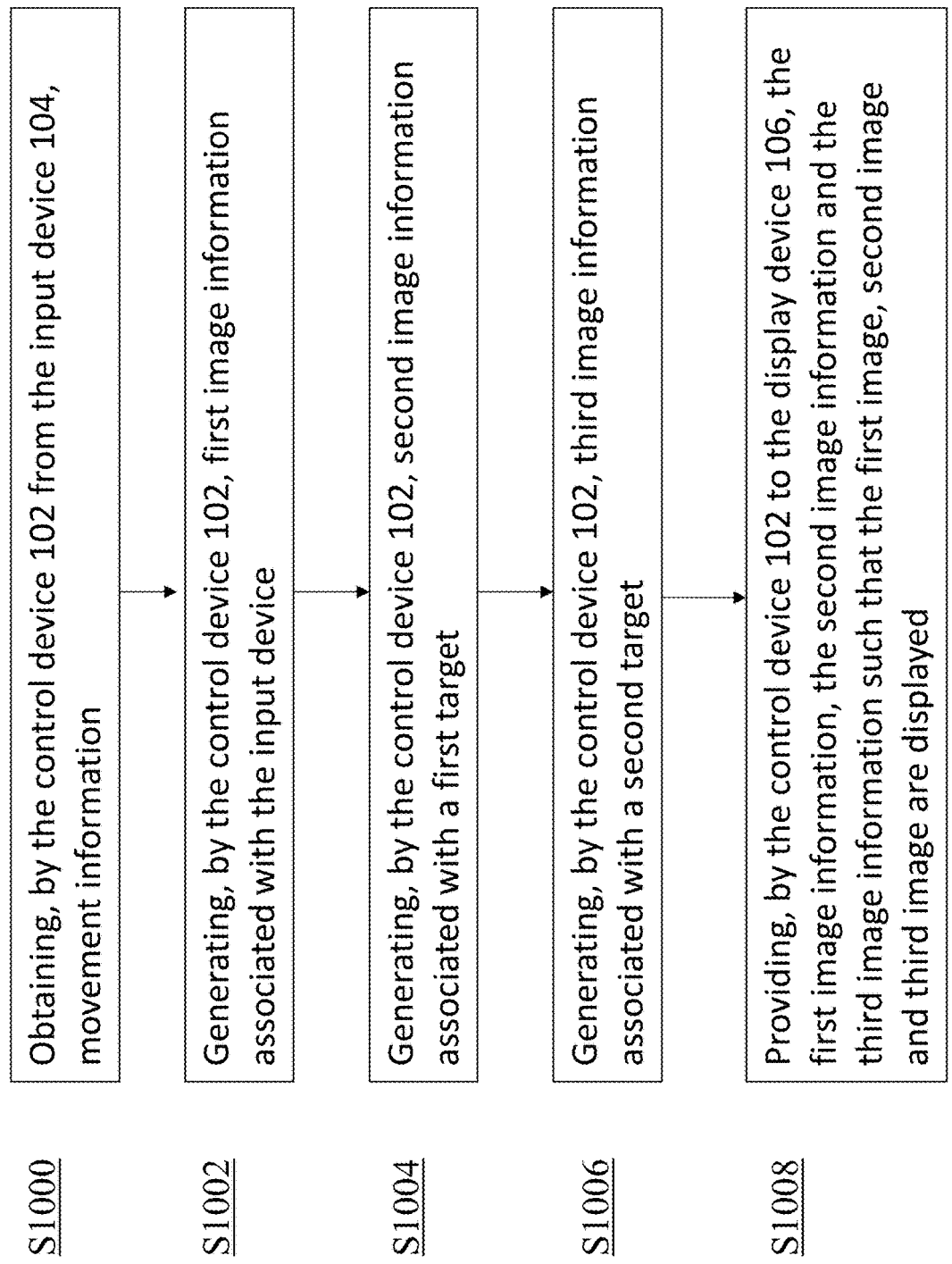
Figure 2C:
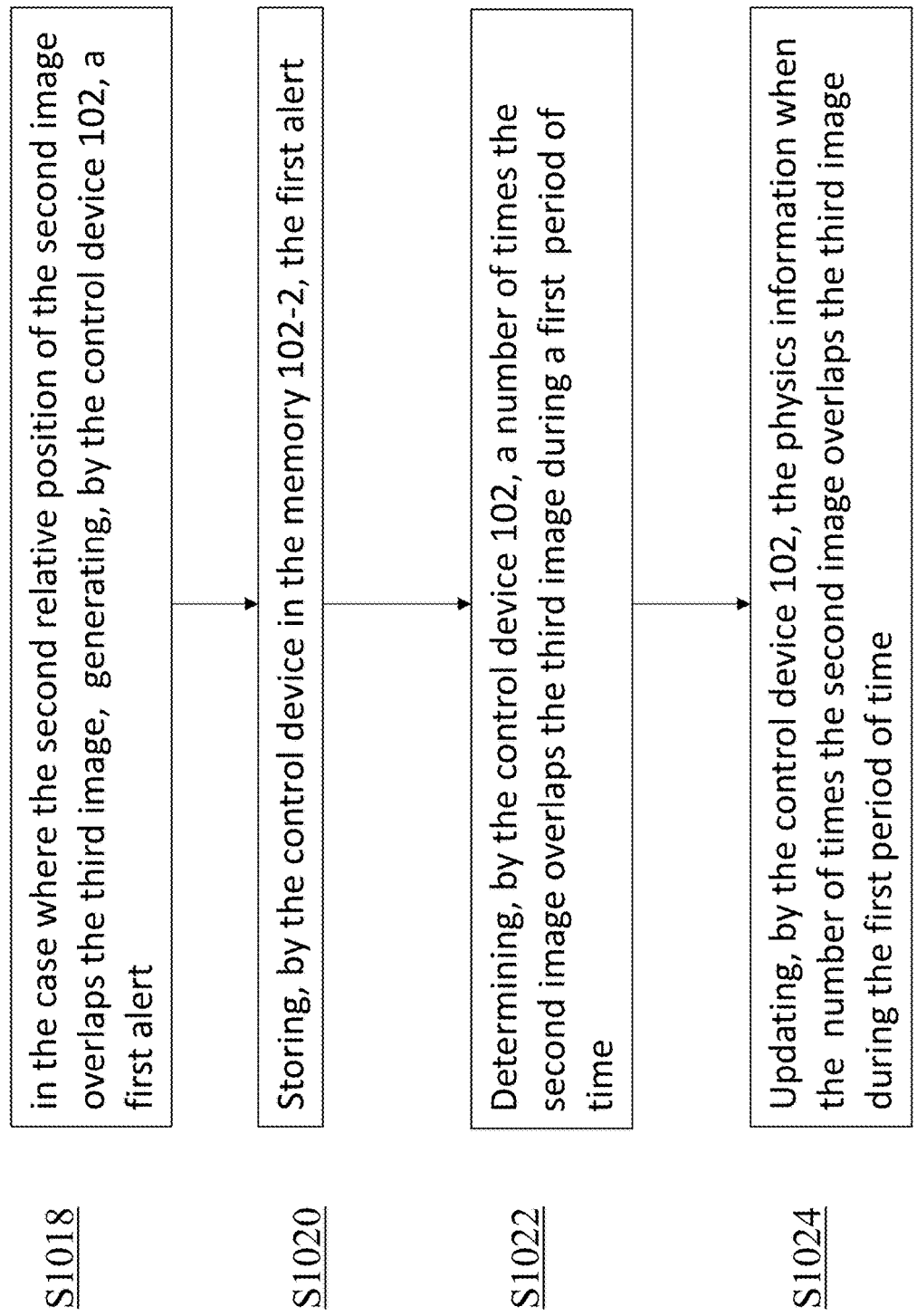
Figure 2D:
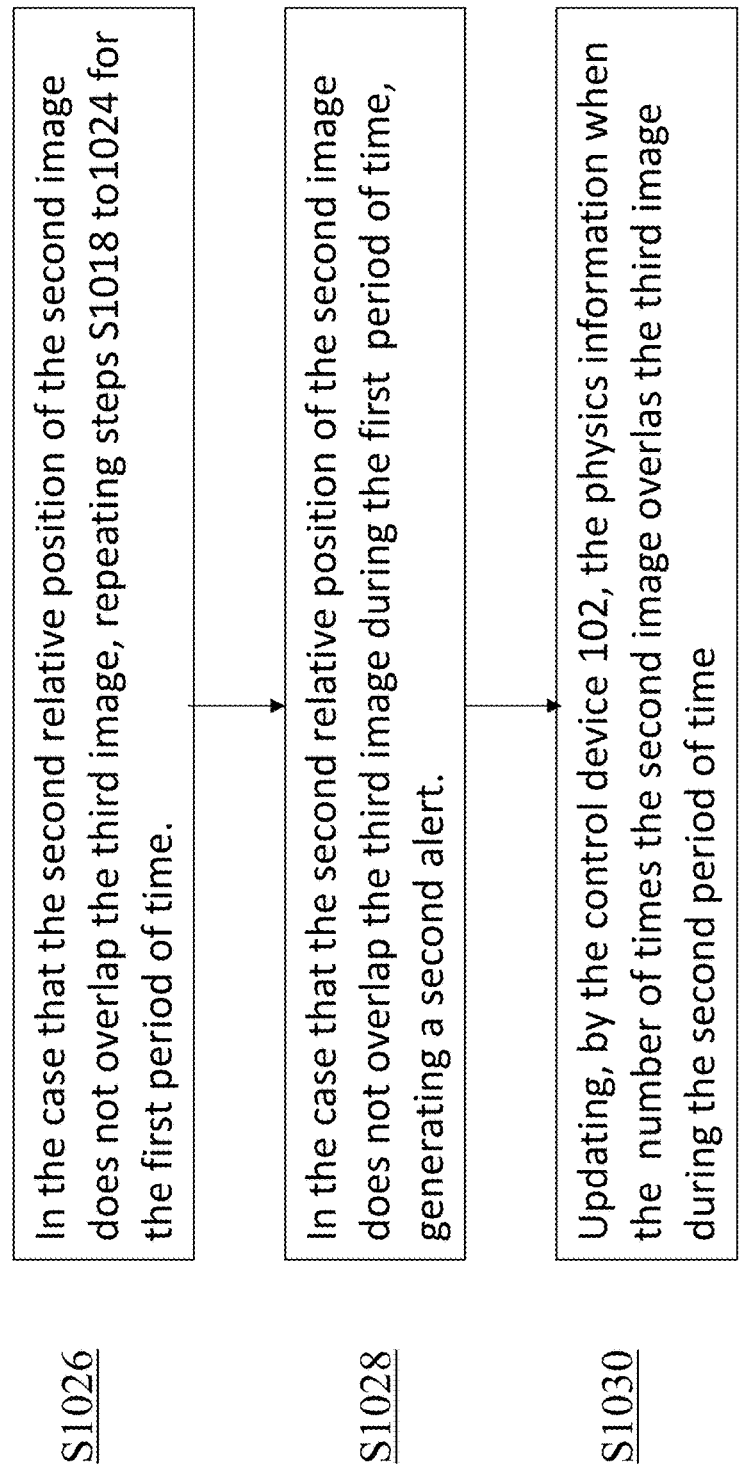

In embodiments, the input device 104 may be a VR wireless hand held controller, an example of which is illustrated in FIG. 1A. In embodiments, the input device 104 may be a wearable device. In embodiments, the input device 104 may be a glove. In embodiments, the movement information, including the position information, speed information and direction information may be stored in the memory 104-2. In embodiments, the movement information may be stored temporarily in the memory 104-2 prior to being sent to the control device 102. In embodiments, the memory 104-2 may include processor executable code that when executed by the processor 104-1 provides instructions or control signals to control the position sensor 104-4 to provide the position information and acceleration information and to store it in the memory 104-2 and/or send it to the control device 102.

In embodiments, the system 100 may include a display element 106 operably connected to the control device 102. In embodiments, the control device 102 may be integrated into the display device 106. In embodiments, the control device 102 may be separate from the display device 106. In embodiments, the display device 106 may be configured to display one or more images. In embodiments, the display device 106 may be a virtual reality headset, an example of which is illustrated in FIG. 1A, which may include a display element positioned in front of a user's eyes in which the at least one image may be displayed. In embodiments, the virtual reality headset, such as the OCULUS or Quest headsets and other virtual reality headsets, for example, and may include one or more speakers or other transducers operable to provide sound. In embodiments, the display device 106 may be a heads up display (HUD) device. In embodiments, the display device 106 may be wearable smart glasses, such as GOOGLE glasses or Holo Lens, to name a few.

In embodiments, the display device 106 may include a processor 106-1 and a memory 106-2 operably connected thereto. In embodiments, the display device 106 may include a connection interface 106-3 configured to provide communication with one or more external devices or networks, including the control device 102 and/or the input device 104. In embodiments, the display device 106 may communicate with the control device 102 via a wireless connection. In embodiments, the display device 106 may communicate with the control device 102 via a wired connection.

In embodiments, the display device 106 displays one or more images to a user based on image information provided by the control device 102. In embodiments, the memory 106-2 of the display device 106 may include processor executable code that when executed buy the processor 106-1 controls the display device 106 to provide one or more images for viewing on the display device.

In embodiments, the memory 102-2 of the control device 102 includes processor executable code that when executed by the processor 102-1 executes a series of steps. In embodiments, the memory 102-2 may be integrated into the control device 102. In embodiments, the memory 102-2 may be separated from the control device and operably connected thereto via a network, bus or other data connection. FIGS. 2A-2D illustrate exemplary flowcharts of these steps.

In embodiments, the control device 102 may, at step S1000, obtain from the first input device 104, the movement information. In embodiments, the movement information may be stored in the memory 102-2. In embodiments, at step S1002, the control device 102 may then generate first image information associated with the input device 104 based at least on the movement information. In embodiments, the first image information may be provided such that the first image associated with the input device is shaped like a portion of the user's body. In embodiments, at step S1004, the control device 102 may generate second image information associated with a first target. In embodiments, the second image information may include second position information indicating a second position of the first target and physics information associated with simulated physical properties of the first target. In embodiments, the second position information is provided to place the first target at a desired position for interaction with the user via the input device 104.

In embodiments, the physics information may be associated with simulated physical characteristics of the first target. In embodiments, the simulated physical characteristics of the first target may be used to determine movement of the second image associated with the first target on the display 106 as it interacts with the first image associated with the input device 104, the movement of which corresponds to movement of a portion of the user's body as it moves in the real world. In embodiments, the physics information may include simulated mass information associated with a simulated mass of the first target. In embodiments, the physics information may include simulated friction information associated with simulated friction of the first target associated with resistance of the first target to movement. In embodiments, the physics information may include simulated spring tension information associated with a resiliency of a spring associated with the first target. In embodiments, the spring associated with the first target may be represented in the second image. In embodiments, the spring tension information may be used to determine how the first target moves on the display. In embodiments, the physics information may include simulated inertia information associated with simulated inertia of the first target. In embodiments, the physics information may include simulated gravity information associated with simulated gravity of the first target. In embodiments, the physics information may include simulated hardness information associated with a hardness of the first target. In embodiments, the hardness of the target is associated with a tendency of the first target to resist compression. In embodiments, the physics information may include duration information associated with a period of time that the first target is displayed on the display device 106. In embodiments, the physics information may include size information associated with a size of the first target. In embodiments, the physics information may include color information associated with a color of the first target. In embodiments, as discussed below, the physics information may be updated or changed to change the simulated physical characteristics of the first target, as it would behave in the real world, as the user progresses in training.

In embodiments, the physics information may be generated by the control device 102 and stored in the memory 102-2. In embodiments, the physics information may be obtained by the control device 102. In embodiments, the physics information may be accessed and retrieved from the memory 102-2. In embodiments, the physics information may be obtained from an external source. In embodiments, the physics information may be provided to the control device 102 via an input element, such a keyboard, mouse, or other input element operably connected to the control device. In embodiments, the physics information may be updated by a user, via the input element, for example. In embodiments, the physics information may be updated or revised by the processor 102-1 of the control device 102, as will be discussed in further detail below.

In embodiments, at a step S1006, the control device 102 may generate third image information associated with a second target. In embodiments, the third image information may include third position information associated with a second position of the second target in three dimensional space. In embodiments, the third position information is generated to position the second target at a desired position relative to the first target. In embodiments, the third position information may include second target distance information associated with a predetermined distance where the desired position is the predetermined distance from the first target. In embodiments, the third position information may include the second target distance information associated with the predetermined distance from the first target and the third position information is generated such that the desired position is the predetermined distance from the first target. In embodiments, the third position information may be provided by a user, via the input element such as a button, switch, keyboard or touch screen, to name a few. In embodiments, the third position information may be associated with a second target point in three dimensional space. In embodiments, the third position information may be determined based on the movement information and the physics information to position the second target at the desired point relative to the first target such that when the user strikes the first target properly, that is with appropriate force and in the appropriate direction, the first target is moved toward and into contact with the second target.

In embodiments, at step S1008, the control device 102 may provide the first image information, the second image information and the third image information to the display device 106. In embodiments, a first image associated with the input device and based on the first image information may be provided on the display device 106. In embodiments, the first image may move on the display from the current position associated with the first position information in accordance with the acceleration information. In embodiments, the first image information may be used to generate the first image at the first position in three dimensional space on the display device 106. In embodiments, a second image associated with the first target is provided on the display device 106 based on the second image information. In embodiments, the second image information may be used to generate the second image at a second position in three dimensional space on the display device 106. In embodiments, the first image and the second image may be provided on the display device 106 such that the first image and second image can be seen on the display device at the same time. In embodiments, a third image associated with the second target is provided on the display device 106 based on the third image information. In embodiments, the third image information is used to generate the third image at a third position in three dimensional space on the display device 106. In embodiments, the first image, second image and the third image may be provided on the display device 106 concurrently such that the second image and the third image are visible on the display device at the same time.

In embodiments, at step S1010, the control device 102 may determine a first relative position of the first image relative to the second image as the first image moves on the display device 106. In embodiments, when the first relative position of the first image overlaps the second image, this is an indication that the input device 104, which is associated with the first image and the position of the user's hand or other portion of the user's body has contacted the first target. In embodiments, when the first relative position of the first image overlaps the second image, at step 1012, the control device 102 may generate second acceleration information associated with the first target indicating movement of the second image (associated with the first target) away from the first image (associated with the input device 104, or the user's hand or other portion of the user's body) on the display device 106. In embodiment, this movement simulated a successful strike by the user.

In embodiments, the second acceleration information may be based on the movement information of the input device 104, the physics information of the first target and the amount of overlap between the first relative position and the second image. In embodiments, the second acceleration information may include second speed information indicating a second speed at which the second image moves away from the first image to simulate contact between the input device 104 (user's hand or other body part) and the first target. In embodiments, the second direction information indicates a second direction in which the second image moves away from the first image as a result of the contact. In embodiments, when the first relative position of the first image overlaps the second image, the control device 102 may generate an audio or visual cue to signal to the user time that they have completed a successful strike.

In embodiments, at step S1014, the control device 102 may provide the second acceleration information to the display device 106 such that the second image moves away from the first image on the display device.

In embodiments, at step S1016, the control device 102 may determine a second relative position of the second image relative to the third image as the second image moves away from the first image. In embodiments, in the case where the second relative position of the second image overlaps the third image, at step S1018, the control device 102 may generate a first alert indicating that the second image overlaps the third image. In embodiments, the second relative position overlapping the third image indicates that the movement of the input device 104 moved at a desired speed and a desired direction to simulate a correct punch or strike connecting with the first target and thus moving the first target into the second target, which is positioned at the desired position discussed above. In embodiments, the first alert may be a visual alert that may be viewed by a user. In embodiments, the first alert may be an audible alert. In embodiments, the first alert may be a point awarded to the user. In embodiments, the first alert may include a first time stamp indicating a time at which the second image overlapped the third image. In embodiments, in step S1020, the control device 102 may store the first alert and the first time stamp in the memory 102-2. In embodiments, in step 1022, the control device 102 may determine a number of times the second image overlaps the third image during a first period of time. In embodiments, the determination in step S1022 may include accessing the first alert and first time stamp stored in the memory 102-2. In embodiments, when the number of times the second image overlaps the third image during the first period of time exceeds a first threshold, it is an indication of proficiency of the user with respect to the first target. In embodiments, when the user shows proficiency in contacting the first target, the difficulty associated with contacting the first target may be increased to reflect the increased skill of the user.

In embodiments, in the case where the number of times the second image overlaps the third image during the first period of time exceeds the first threshold, at step S1024, the control device 102 may update the physics information associated with the first target to make it more difficult to move the second image toward the third image. In embodiments, the updating step of S1024 may include increasing a simulated friction value associated with the simulated friction of the first target resulting in the first target having increased simulated friction and thus making it more difficult to move the first target. In embodiments, the updating step of S1024 may include increasing a simulated mass value associated with the simulated mass associated with the first target making it more difficult to move the first target. In embodiments, the updating step of S1024 may include increasing a spring tension value associated with the spring tension information associated with the first target. In embodiments, the spring tension may be associated with a simulated spring associated with the first target and biased to hold the first target in place such that increasing the spring tension makes it more difficult to move the first target. In embodiments, the updating step of S1024 may include increasing a simulated inertia value to increase the inertia associated with the first target making it more difficult to move the first target. In embodiments, the updating step of S1024 may include increasing a gravity value to increase simulated gravity associated with the first target [to make the first target more difficult to move. In embodiments, the updating step of S1024 may include decreasing a hardness value associated with the hardness information to reduce the hardness associated with the first target to make the first target more difficult to move. In embodiments, the updating step of S1024 may include reducing a duration value associated with the duration of time the first target is displayed to reduce the amount of time the first target is displayed and make it more difficult to contact and move the first target.

In embodiments, the updating step of S1024 may include generating a first tag indicating that the second image overlaps the third image. In embodiments, the control device 102 may store the first tag in the memory 102-2.

In the case where the second relative position of the second image does not overlap the third image, the control device 102 may repeat steps S1018 to S1024 for the first period of time, at step S1026. In embodiments, when the second relative position of the second image does not overlap the third image during the first period of time, generating, at step S1028, a second alert indicating that the second image does not overlap with the third image. In embodiments, the second alert is visual. In embodiments, the second alert is audible. In embodiments, the control device 102 may store the second alert and the first time stamp in the memory 102-2.

In embodiments, when the second image does not overlap the third image during the first period of time, updating the physics information associated with the first target at step S1030. In embodiments, the physics information may be updated in step S1030 to make it easier for the second image to overlap with the third image. In embodiments, during the updating step 1030, the simulated friction information is updated to decrease friction of the first target to allow the first target to move more easily. In embodiments, the simulated mass information may be updated to decrease the simulated mass of the first target to allow the first target to move more easily. In embodiments, the simulated spring tension information is updated to decrease the tension to allow the first target to move more easily. In embodiments, the simulated inertia information is updated to decrease inertia of the first target to allow the first target to move more easily. In embodiments, the simulated gravity information is decreased to decrease gravity of the first target and allow the first target to move more easily. In embodiments, the simulated hardness information is increased to increase the hardness of the first target and allow the first target to move more easily. In embodiments, the duration information is updated to increase the period of time that the first target is displayed on the display device to allow the first target to be moved more easily. In embodiments, the step of generating the second alert includes generating a second tag indicating that the second image does not overlap the third image.

In embodiments, the control device 102 may update the physics information in the updating step 1030 using artificial intelligence. In embodiments, a training set may be generated based at least on the first tag, the second tag, the first image information, the second image information, the third image information, the physics information, the acceleration information and the movement information. In embodiments, a machine learning algorithm may be trained using the training set. In embodiments, the machine learning algorithm may be used to update the physics information. In embodiments, the physics information is modified based on user input.

Figure 3:
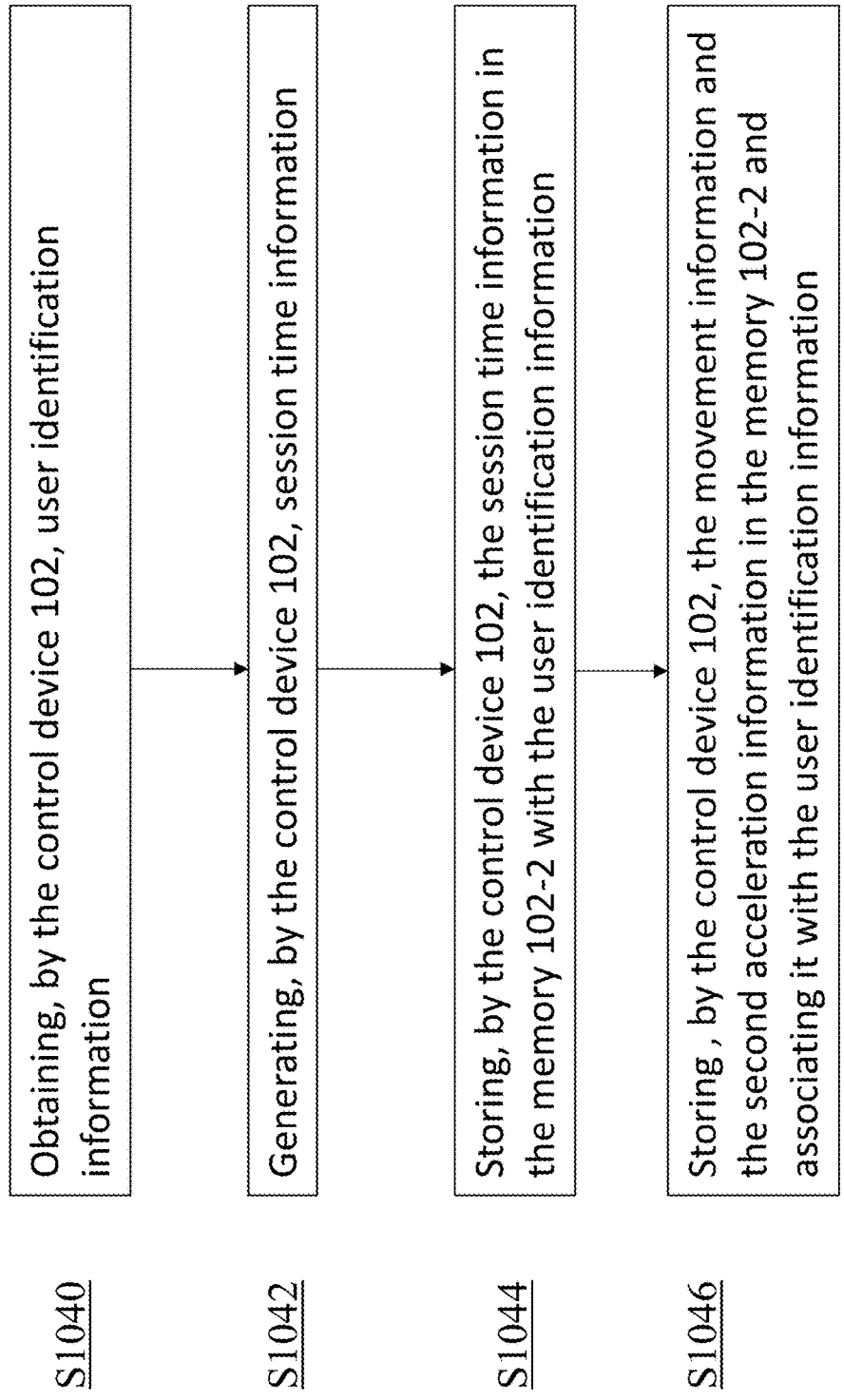

In embodiments, at a step S1040, shown in FIG. 3, the control system 102 may obtain user identification information associated with a first user associated with the first input device 104. In embodiments, the user identification information may be provided by the user via an input element. In embodiments, the user identification information may be received via the connection interface 102-3. In embodiments, the user identification information may be retrieved from the memory 102-2.

In embodiments, the user identification information may be stored by the control device 102 in the memory 102-2. In embodiments, step S1040 may occur prior to step S1000. In embodiments, at step S1042, the control device 102 may generate session time information associated with a second period of time that the user uses the first control device 104. In embodiments, at step S1044, the control device 102 may store the session time information in the memory 102-2. In embodiments, step S1044 may include associating the session time information with the user identification information. In embodiments, the control device 102, at step 1046, may store the movement information, the second acceleration information, the first alert, the second alert, the first tag and the second tag in the memory 102-2. In embodiments, the movement information, the second acceleration information, the first alert, the second alert, the first tag and the second tag may be associated with the user identification information.

Figure 4:
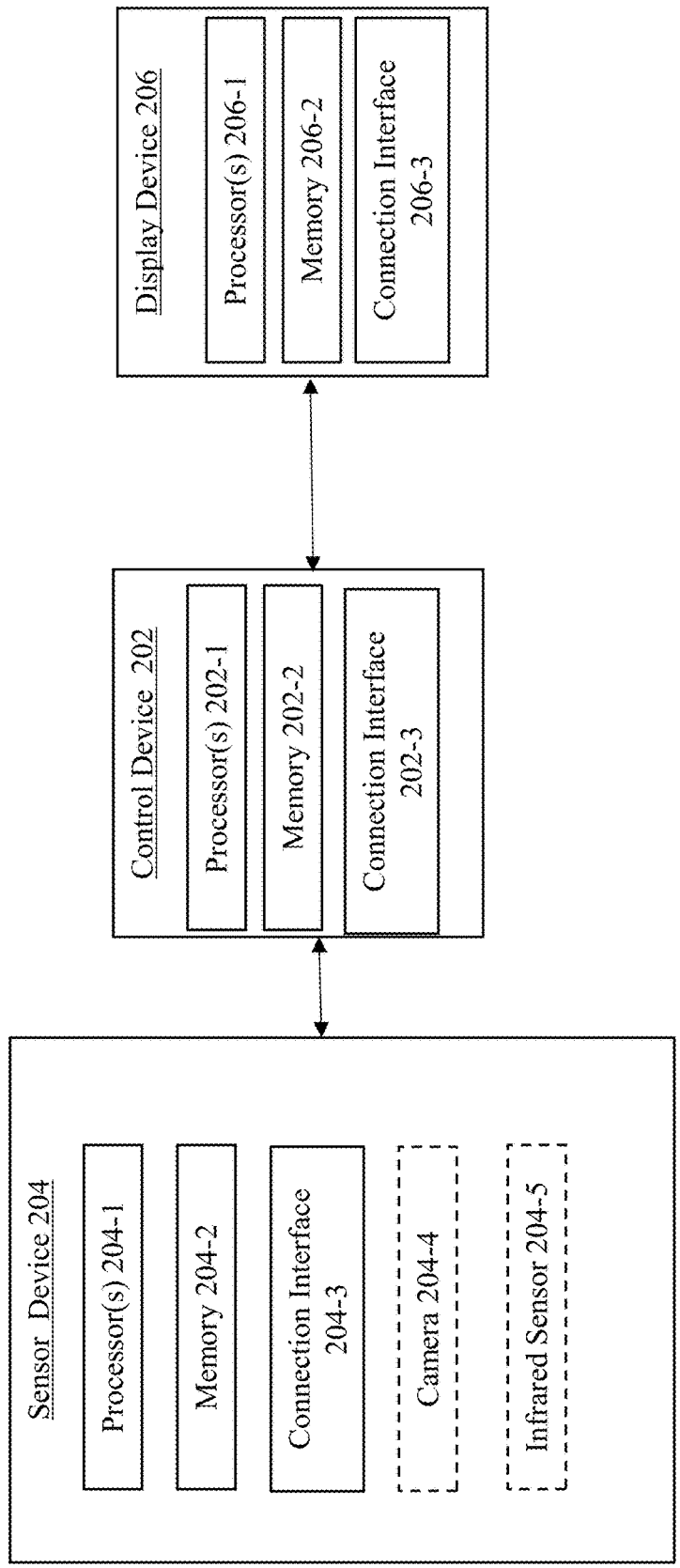
FIG. 4 illustrates an exemplary illustration of a virtual reality system for training a user to perform a physical activity in accordance with another embodiment of the present disclosure.

FIG. 4 illustrates an exemplary system 200 for training a user to perform a physical activity in accordance with another embodiment of the present disclosure. In embodiments, the system 200 may include a control device 202 that is similar in function and structure to the control device 102 discussed above. In embodiments, the control device 202 may be operably connected to a sensor device 204. In embodiments, the sensor device 204 may be configured to provide movement information associated with a portion of a body of a user as the user participates in the physical activity. In embodiments, the sensor device 204 may include multiple sensors.

In embodiments, the movement information provided by the sensor device 204 may be similar to that provided by the input device 104 and includes: position information associated with a current position of the portion of the body of the user and acceleration information associated with movement of the portion of the body of the first user from the current position. In embodiments, as discussed above, the acceleration information may include first speed information associated with a first speed of movement of the portion of the body; and first direction information associated with a first direction of movement of the portion of the body. In embodiments, the acceleration information may include orientation information indicating a pitch and yaw of the portion of the body.

In embodiments, the sensor device 204 may be a camera (or cameras) configured to provide user image information associated with at least the portion of the body of the user and the position information and the acceleration information are provided based on the user image information. In embodiments, the user image information may be associated with an image of the portion of the body of the user as it moves. In embodiments, the position information and acceleration information may be provided based on the user image information. In embodiments, the camera (or cameras) may be positioned on a virtual reality headset worn by the user which may include the display 206. In embodiments, the image information may be used to provide position and acceleration information with respect to other portions of the body of the user. In embodiments, the camera (or cameras) may be provided in or on the input device 104.

In embodiments, the sensor device 204 may be or include a camera 204-4 as well as at least one infrared sensor 204-5. In embodiments, an infrared source or infrared reflector may be provided on or otherwise associated with the portion of the body such that the source or reflector corresponds to a position of the portion of the body. In embodiments, the infrared sensor 204-5 may be the camera 204-4, which may provide infrared detection information associated with the infrared radiation provided by the infrared source or IR reflector. In embodiments, the infrared sensor 204-5 may be a separated device. In embodiments where an infrared reflector is associated with the portion of the body, an infrared source may be provided in or on the sensor device 204 to emit infrared radiation that is reflected by the infrared reflector associated with the portion of the body. In embodiments, the infrared source may be provided on or adjacent to the sensor device 204. In embodiments, the infrared source may be provided elsewhere and directed at the user. In embodiments, the infrared source or reflector may be mounted on or otherwise associated with the portion of the body and provides or reflects infrared radiation to the infrared sensor 204-5. In embodiments, the position information and acceleration information may be provided based on the infrared detection information. In embodiments, multiple infrared sources may be provided around the user and may be reflected by the infrared reflector provided on or associated with the portion of the user's body.

In embodiments, the camera 204-4 may provide user image information as discussed above, while the infrared sensor 204-5 may provide the infrared detection information at the same time. In embodiments, the position information and acceleration information may be provided based on the user image information and the infrared detection information.

In embodiments, the sensor device 204 may include more than one camera. In embodiments, the sensor device 204 may include a first camera and a second camera configured to provide first user image information and second user image information, respectively. In embodiments, the first user image information and second user image information may be associated with the portion of the body. In embodiments, the first user image information and the second user image information may be associated with images of the portion of the body of the user as it moves. In embodiments, the position information and the acceleration information may be provided based on the first user image information and the second user image information.

In embodiments, the sensor device 204 may include the infrared sensor 204-5 discussed above as well as the first camera and the second camera. In embodiments, at least one infrared source or reflector associated with the portion of the body provides or reflects infrared radiation that may be detected by the infrared sensor 204-5 to provide the infrared detection information. In embodiments, the position information and the acceleration information may be based on the first user image information, the second user image information and the infrared detection information.

In embodiments, the infrared sensor 204-5 may be the camera. In embodiments, the infrared sensor 204a may include the first camera and the second camera. In embodiments, as noted above, the infrared sensors 204-5 may be a stand-alone device.

In embodiments, the sensor device 204 may include a LIDAR system providing the position information and acceleration information based on LIDAR information provided by the LIDAR system. In embodiments, the LIDAR system may include an electromagnetic radiation source configured to direct electromagnetic radiation toward a surface associated with the portion of the user and an electromagnetic receiver device configured to detect electromagnetic radiation received from the surface associated with the portion of the user and provide the LIDAR information. In embodiments, the position information and the acceleration information may be based on the LIDAR information.

In embodiments, the sensor device 204 may be a gyroscopic movement sensor configured to provide gyroscopic information associated with the portion of the body and the position information and the acceleration information may be provided based on gyroscopic information.

In embodiments, the sensor device 204 may include one or more electromagnetic field sensors providing electromagnetic field information associated with the portion of the body and the position information and the acceleration information are based on the electromagnetic field information. In embodiments, the one or more electronic field sensors may be wearable inductance sensors. In embodiments, one or more magnetic elements may be provided on or otherwise associated with the portion if the user's body such that the electronic field sensors provide field information associated with eh magnetic elements on the portion of the user's body that may be used to determine the position information as well as the acceleration information.

In embodiments, the sensor device 204 may include one or more force plates provided on a floor in the vicinity of the user. In embodiments, the one or more force plates may be configured to provide weight information associated with the user. In embodiments, the weight information may be associated with the user's body. In embodiments, the position information and acceleration information may be based on at least the weight information.

In embodiments, the sensor device 204 may include one or more cameras providing the user image information associated with the portion of the user, the infrared sensor 204-5 providing the infrared detection information associated with the portion of the body, the LIDAR system providing LIDAR information associated with the portion of the user, the gyroscopic sensor providing gyroscopic information associated with the portion of the user, the electromagnetic field sensor providing electromagnetic field information associated with the portion of the body and the force plate providing weight information associated with the body of the user. In embodiments, the position information and acceleration information may be based on one or more of the user image information, the infrared detection information, the LIDAR information, the gyroscopic information, the electromagnetic field information and the weight information.

In embodiments, the system 200 may include a display device 206 which may be similar in function and structure to the display device 106 discussed above. In embodiments, the display device 206 may be operably connected to the control device 202 and operable to display one or more images. In embodiments, the display device 206 may be a virtual reality headset, such as that illustrated in FIG. 1a and discussed above with respect to the display device 106. In embodiments, the display device 206 may include the camera, including the first camera and the second camera. In embodiments, the display device 206 may be separate from the camera, including the first camera and the second camera.

In embodiments, the display device 206 communicates with the control device 202 via a wireless connection. In embodiments, the display device 206 may communication with the control device 202 via a wired connection. In embodiments, the control device 202 may be integrated into the display device 206.

Figure 5A:
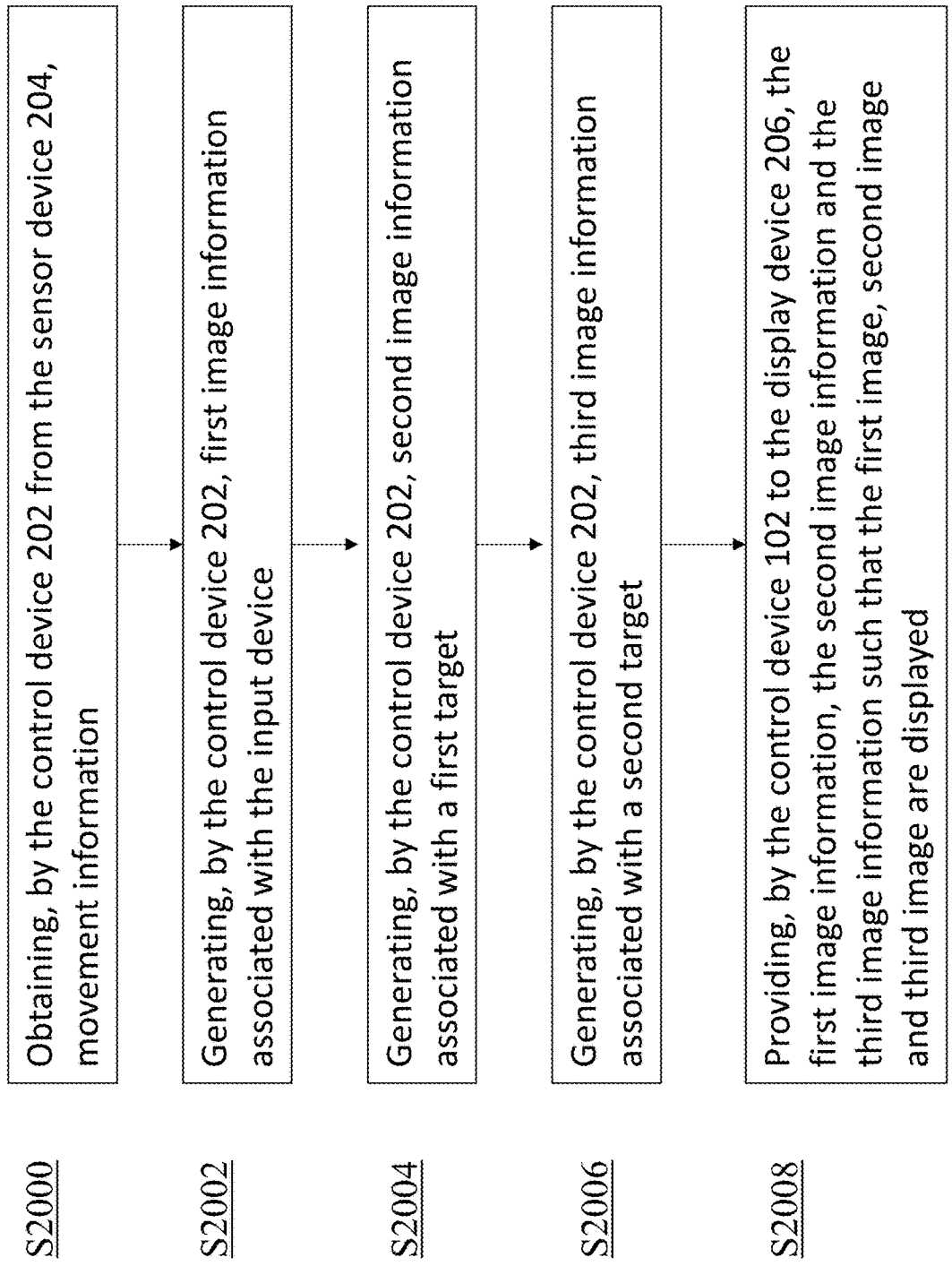
Figure 5C:
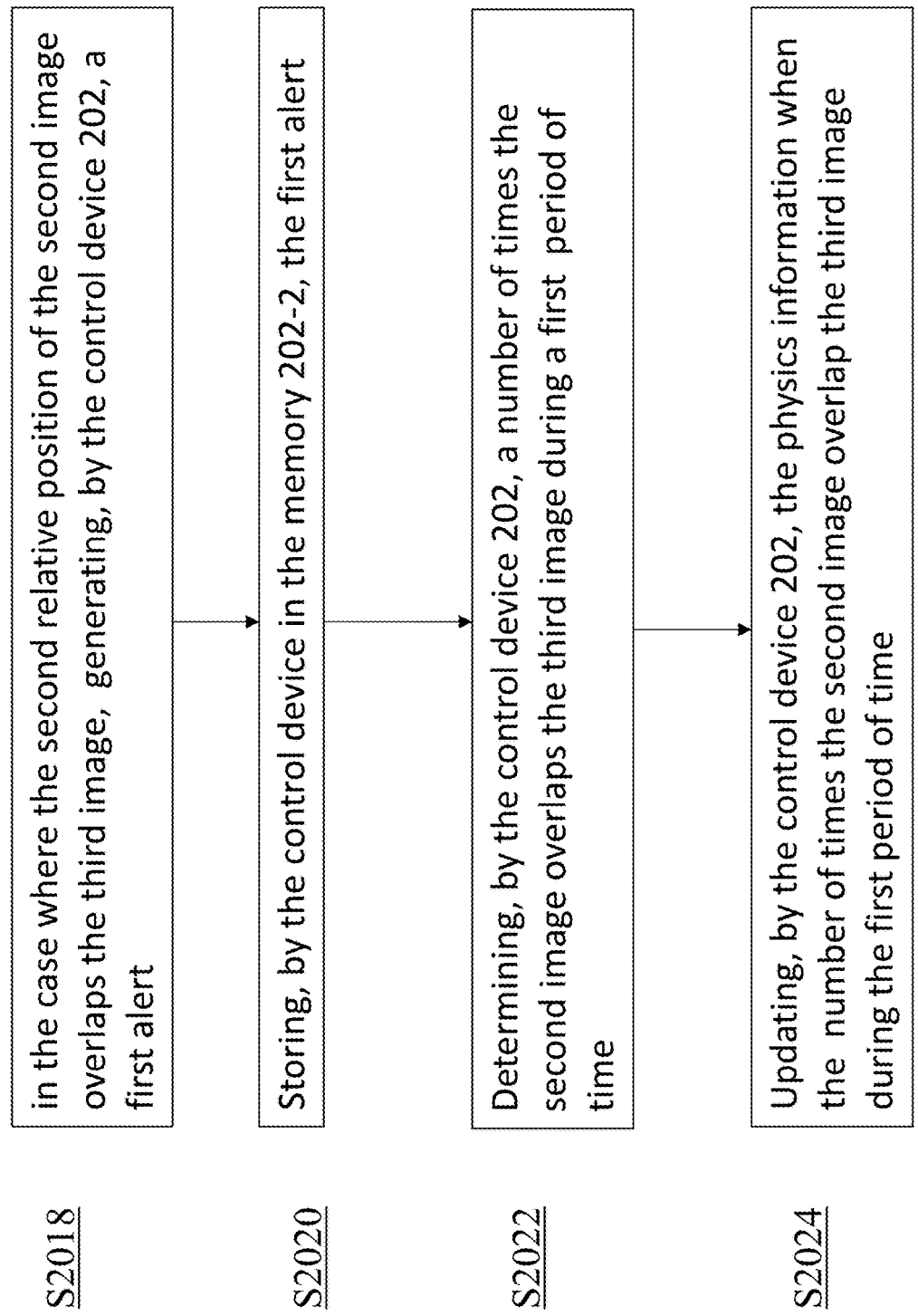
Figure 5D:
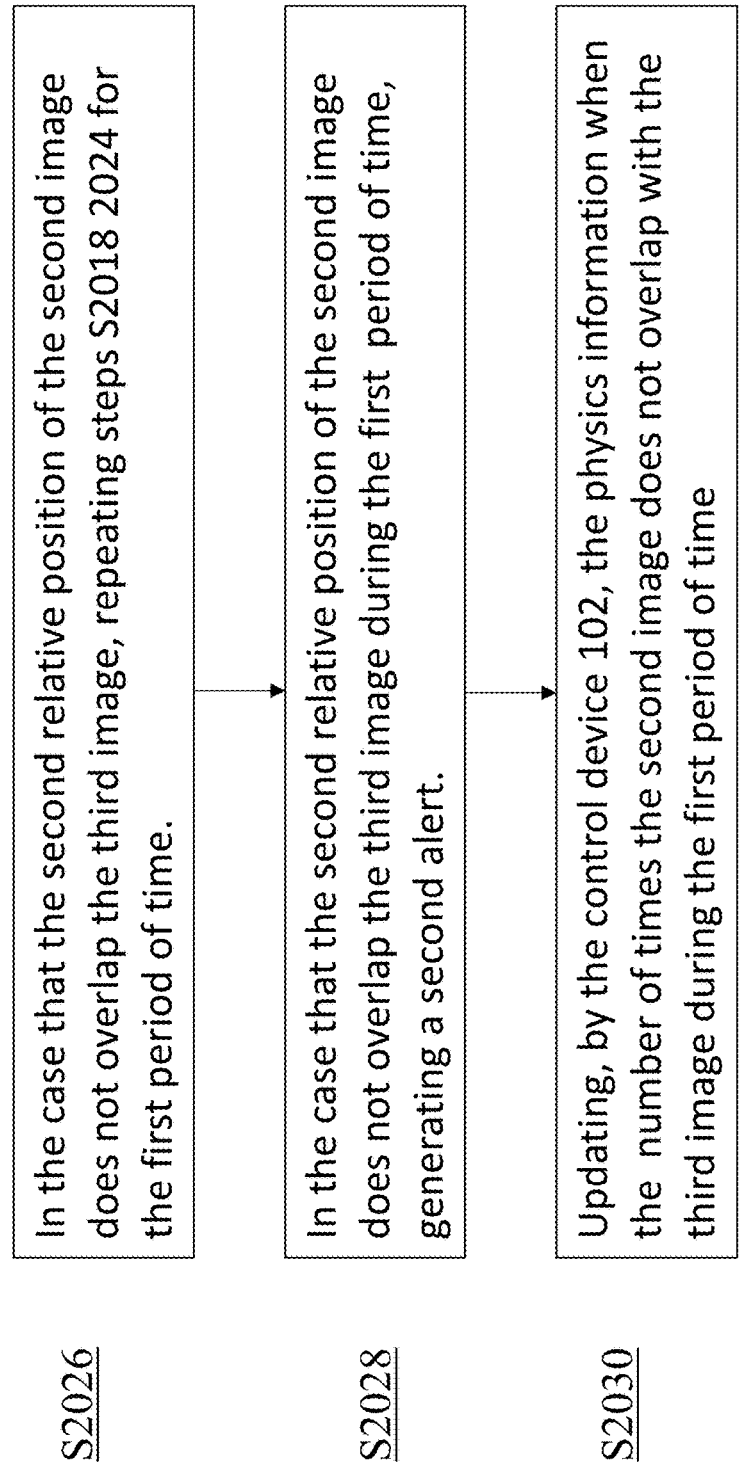
Figure 6A:
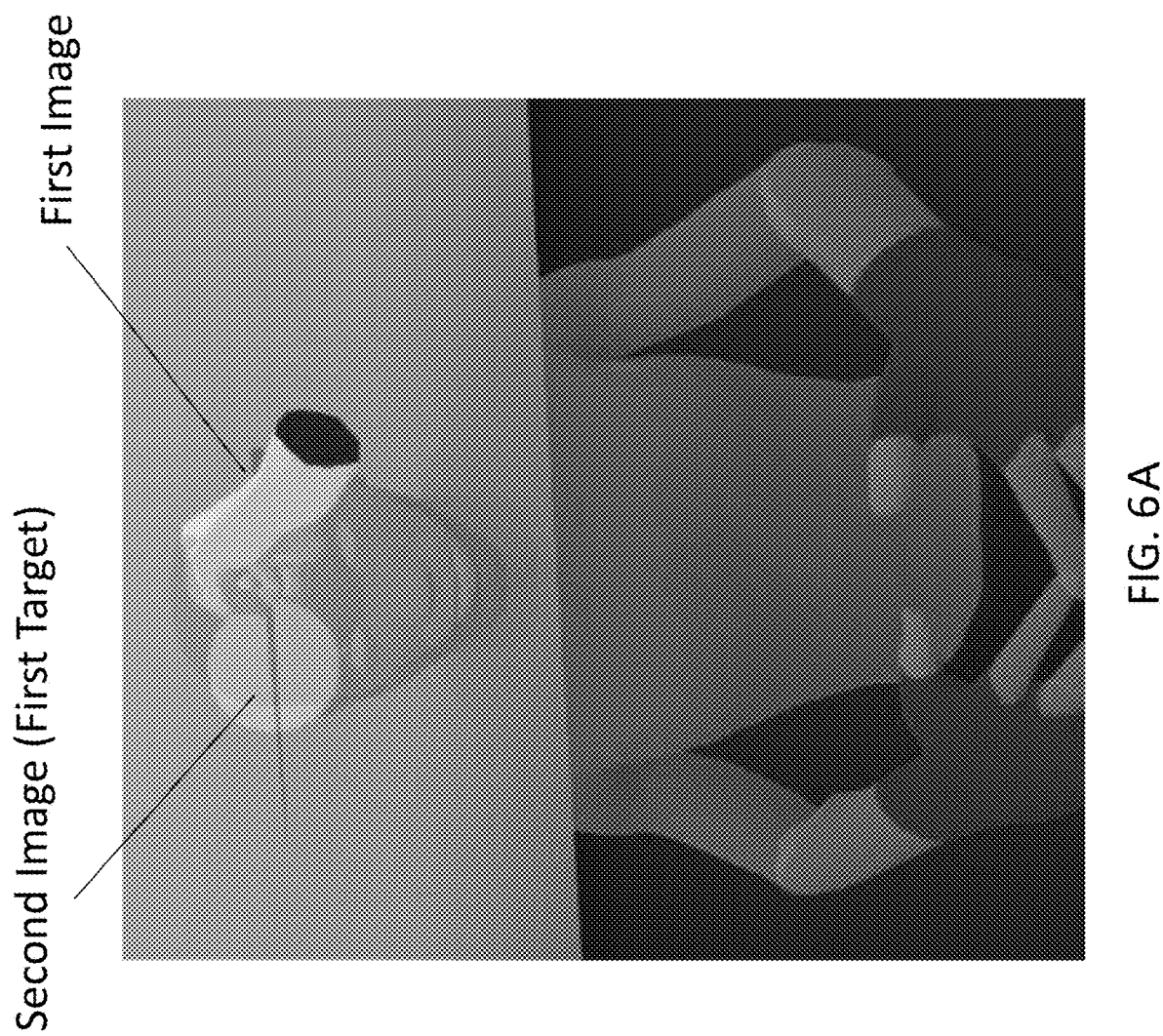
FIG. 6 illustrate an exemplary screen shot showing the first target and the second target on the display device of the system of FIG. 1 or FIG. 4.
Figure 6B:
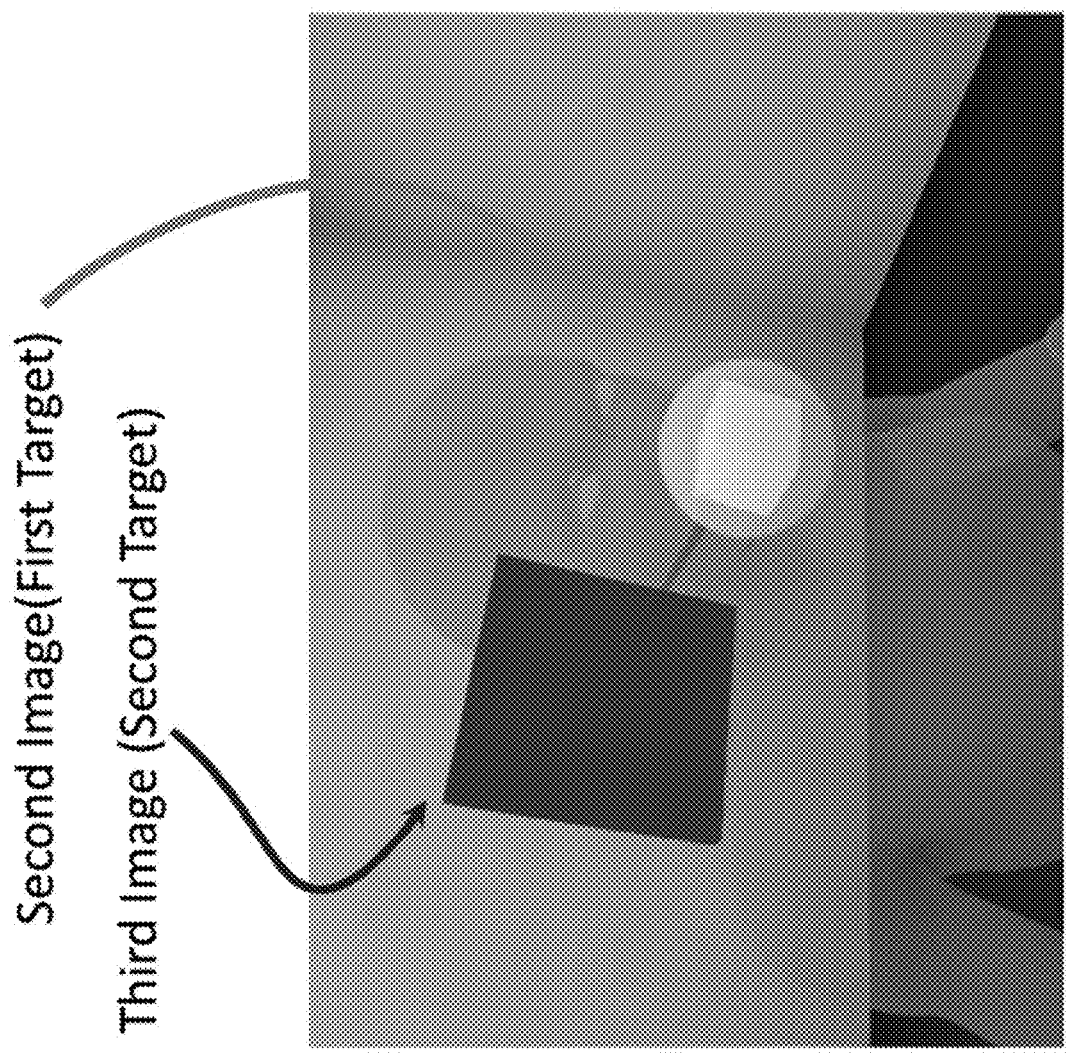

In embodiments, the control device 202, at step S2000 of FIG. 5A, may obtain the movement information from the sensor device 204 in much the same manner as the control device 102 obtains the movement information from the input device 104 in step S1000, as discussed above. In embodiments, the control device 202, at steps S2002 and S2004, may generate first image information associated with the first portion of the user and second image information associated with a first target in much the same manner as discussed above with respect to steps S1002 and S1004. In embodiments, the second image information may be similar to that described above and may include the second position information and physics information discussed above. In embodiments, the physics information may be similar to the physics information discussed above associated with the simulated physical properties of the first target.

In embodiments, the physics information may be generated or obtained as discussed above. In embodiments, the physics information may be provide or modified based on user input as noted above.

In embodiments, the control device 202, at step S2006 may generate third image information associated with a second target in much the same manner as discussed above with respect to step S1006. In embodiments, the third image information is similar to that discussed above and includes a second position of the second target in three dimensional space to position the second target at a desired position and includes second target distance information similar to that discussed above.

In embodiments, the second target distance information may be provided by a user and may be associated with a preset second target point in three dimensional space.

In embodiments, the control device 202, at step S2008, may provide the first image information, the second image information and the third image information to the display device 206 in much the same manner as that described above with respect to step S1008. In embodiments, as noted above, the first image associated with the portion of the body moves on the display device 206 based on the acceleration information. In embodiments, the first image, second image and third image may be displayed on the display device 206 in much the same manner as they are displayed on the display device 106 discussed above.

In embodiments, the control device 202, at step S2010, determines a first relative position of the first image relative to the second image as the first image moves on the display device 206 in much the same manner as described above with respect to step S1010. At step S2012, when the control device 202 determines that the first relative position of the first image overlaps the second image, the second acceleration information associated with the first target is generated in much the same manner as described above with respect to step S1012 including the second speed information and second direction information. In embodiments, the control device 202, at step S2014, may provide the second acceleration information to the display device 206 in much the same manner as discussed above with respect to step S1014. In embodiments, the control device 202, at step S2016, may determine a second relative position of the second image relative to the third image in much the same manner as discussed above with respect to step S1016.

In embodiments, in the case where the second relative position of the second image overlaps the third image, the control device 202, at step S2018 generates a first alert indicating that the second image overlaps the third image in much the same manner as in step S1018. In embodiments, as noted above, the alert may be visual or audible. In embodiments, as noted above, the alert may include a first time stamp indicating a time at which the second image overlapped the third image and the first alert and the first time stamp may be stored in the memory 202-2. In embodiments, the control device 202, at step S2020, may store the first alert in the memory 202-2 in much the same manner as discussed above.

In embodiments, at step S2022, the control device 202 may determine a number of times the second relative position of the second image overlaps the third image during the first period of time. In embodiments, step S2022 may be accomplished in much the same manner as discussed about with respect to step S1022. In embodiments, the control device 202, at step S2024 updates the physics information when the number of times the second image overlaps the third image during the first period of time exceeds a threshold. In embodiments, the updating step S2024 may be performed in much the same manner as the updating steps 1024 discussed above to make it more difficult to move the first target toward the second target.

In embodiments, in the case that the second relative position of the second image does not overlap the third image, at step S2026, steps S2018 to S2024 may be repeated during the first period of time.

In embodiments, when the second relative position of the second image does not overlap the third image during the first period of time, generating, by the control device 202, at steps S2028, a second alert in a manner similar to that described above with respect to step 1028 discussed above. In embodiments, a second tag may be generated based on the second alert. In embodiments, when the second relative position of the second image does not overlap with the third image during the first period of time, updating, by the control device 202, the physics information at step S2030 to make it easier to move the first target toward the second target. In embodiments, the updating step 2030 may be implemented using artificial intelligence in much the same manner discussed above with respect to step 1030.

As the user uses the system 100, 200, they form a predictive mental model of the velocity (speed and direction) required to successfully strike the first target to log a successful strike in a real world environment, triggering generation of the first alert. In embodiments, the system 100,

200 may track successful strikes, as noted above, and may alter the physics information for the first target to increase difficulty when the user strings together a number of successful strikes. In embodiments, the system 100, 200 alters (improves) motor performance for the physical activity in a manner that transfers into the real world. In embodiments, the physics information is updated to gradually change over time to gradually modify the velocity and reaction time needed to successfully strike the first target and adapts to user performance on the fly.

In embodiments, the movement information may be stored in the memory 102-2 and/or elsewhere and may be used to update physics information for future sessions as well. In embodiments, the movement information may be used to quantitate training gains over sessions and to predict athletic performance in real-world contests/sports-events.

In embodiments, the use of virtual targets with associated physics information, such as the first target allows customization of the speed and direction of the strike required of the user to score a point, achieve a successful strike and achieve the training objectives that will translate into the real world.

In use, the systems 100, 200 allow the user to strike the first target and also see how the first target moves in the display 106, 206 based on the strike. In embodiments, in the system 100, 200, when the user strikes the first target, using the input device 104 or the portion of their body tracked buy the sensor device 204, with enough velocity and from the correct direction (direction appropriate for correct boxing form) the first target moves to the second target to score a point (generate the first alert). In embodiments, the first alert may be visual or audio, as noted above. In embodiments, the first target may be positioned to require various punching techniques and to assemble a training program. As noted above the physics information associated with the target may be updated to increase skill and stamina.

Although the present invention has been described in relation to particular embodiments thereof, many other variations and modifications and other uses will become apparent to those skilled in the art. It is preferred, therefore, that the present invention be limited not by the specific disclosure herein.

What is claimed is:
1. A system for training a user to participate in a physical activity comprising:
 (a) a control device including:
  i. one or more processors; and
  ii. memory operatively connected to the one or more processors;
 (b) a first input device operably connected to the control device and configured to provide movement information associated with the first input device as the user participates in the physical activity,
 wherein the movement information includes:
  i. first position information associated with a current position of the first input device;
  ii. first acceleration information associated with movement of the first input device from the current position,
   wherein the first acceleration information includes:
    1. first speed information associated with a first speed of movement of the first input device; and
    2. first direction information associated with a first direction of movement of the first input device;
 (c) a display device operably connected to the control device and operable to display one or more images;

wherein the memory in the control device includes processor executable code that when executed by the one or more processors executes steps of:
 i. obtaining, by the control device from the first input device, the movement information;
 ii. generating, by the control device, first image information associated with the first input device based at least on the movement information;
 iii. generating, by the control device, second image information associated with a first target, wherein the second image information includes:
  1. second position information indicating a second position of the first target; and
  2. physics information associated with simulated physical properties of the first target;
 iv. generating, by the control device, third image information associated with a second target, wherein the third image information includes:
  1. third position information associated with a third position of the second target in three dimensional space,
  wherein the third position information is generated to position the second target at a desired position;
 v. providing, by the control device to the display device, the first image information, the second image information and the third image information such that:
  1. a first image associated with the input device and based on the first image information is provided on the display device, wherein the first image moves based on the acceleration information;
  2. a second image associated with the first target is provided on the display device based on the second image information;
  3. a third image associated with the second target is provided on the display device based on the third image information;
 vi. determining, by the control device, a first relative position of the first image relative to the second image as the first image moves on the display device;
 vii. in the case where the first relative position of the first image overlaps the second image, generating second acceleration information associated with the first target indicating movement of the first target away from the second image on the display device, wherein the second acceleration information is based on the movement information and the physics information and includes:
  1. second speed information indicating a second speed at which the first target moves away from the second image;
  2. second direction information indicating a second direction in which the first target moves away from the second image;
 viii. providing, by the control device, the second acceleration information to the display device such that the second image moves away from the first image on the display device;
 ix. determining, by the control device, a second relative position of the second image relative to the third image;
 x. in the case where the second relative position of the second image overlaps the third image, generating, by the control device, a first alert indicating that the second image overlaps the third image;
 xi. in the case where the second relative position of the second image does not overlap the third image, repeating steps (c)(ix) to (c)(xi) for a first period of time, and when the second relative position of the second image does not overlap the third image during the first period of time, generating a second alert indicating that the second image does not overlap with the third image.

2. The system of claim 1, wherein the acceleration information includes orientation information indicating a pitch and yaw of the first input device.

3. The system of claim 1, wherein the physics information includes one or more of:
   (1) simulated mass information associated with a simulated mass of the first target;
   (2) simulated friction information associated with simulated friction of the first target;
   (3) simulated spring tension information associated with a resiliency of a spring associated with the first target;
   (4) simulated inertia information associated with inertia of the first target;
   (5) simulated gravity information associated with gravity of the first target;
   (6) simulated hardness information associated with a hardness of the first target;
   (7) duration information associated with a period of time that the first target is displayed;
   (8) size information associated with a size of the first target; and
   (9) color information associated with a color of the first target.

4. The system of claim 1, wherein the processor executable code includes instructions that when executed by the one or more processors perform a step of generating the physics information.

5. The system of claim 1, wherein the processor executable code includes instructions that when executed by the one or more processors perform a step of obtaining the physics information from memory.

6. The system of claim 1, wherein the processor executable code includes instructions that when executed by the one or more processors executes a step of receiving the physics information via an input element operably connected to the control device.

7. The system of claim 1, wherein the second position information includes second target distance information associated with a predetermined distance and the desired position is the predetermined distance from the first target.

8. The system, of claim 1, wherein the second position information includes second target distance information associated with a predetermined distance and the second position information is generated such that the desired position is the predetermined distance from the first target.

9. The system of claim 1, wherein the second position information is associated with a second target point in three dimensional space.

10. The system of claim 1, wherein the first image information is used to generate the first image at a first position in three dimensional space; and
   the second image information is used to generate the second image at a second position in three dimensional space.

11. The system of claim 1, wherein the first image and the second image are provided on the display device concurrently.

12. The system of claim 1, wherein the third image information is used to generate the third image at a third position in three dimensional space.

13. The system of claim 1, wherein the first image, the second image and the third image are provided on the display device concurrently.

14. The system of claim 1, wherein the first alert includes a first time stamp indicating a time at which the second image overlapped the third image.

15. The system of claim 1, wherein the memory includes processor executable code that when executed by the one or more processors perform a step of recording, by the control device, the first alert and the first time stamp in the memory.

16. The system of claim 1, wherein the memory includes processor executable code that when executed by the one or more processors performs a step of determining, by the control device, a number of times the second image overlaps the third image during a second period of time.

17. The system of claim 16, wherein the memory includes processor executable code that when executed by the one or more processors performs a step of, in the case where the number of times the second image overlaps the third image during the first period of time exceeds a first threshold, updating the physics information associated with the first target.

18. The system of claim 17, wherein the simulated friction information is updated to increase simulated friction associated with the first target.

19. The system of claim 17, wherein the simulated mass information is updated to increase simulated mass associated with the first target.

20. The system of claim 17, wherein the simulated spring tension information is updated to increase spring tension associated with the first target.

21. The system of claim 17, wherein the simulated inertia information is updated to increase simulated inertia associated with the first target.

22. The system of claim 17, wherein the simulated gravity information is increased to increase simulated gravity associated with the first target.

23. The system of claim 17, wherein the simulated hardness information is decreased to lower the simulated hardness associated with the first target.

24. The system of claim 17, wherein the duration information is updated to reduce the period of time that the first target is displayed on the display device.

25. The system of claim 1, wherein the step of generating the first alert includes generating a first tag indicating that the second image overlaps the third image.

26. The system of claim 1, wherein the memory includes processor executable code that when executed by the one or more processors performs a step of recording, by the control device, the second alert and the first time stamp in the memory.

27. The system of claim 1, wherein the memory includes processor executable code that when executed by the one or more processors performs a step of, when the second image does not overlap the third image during the first period of time, updating the physics information associated with the first target.

28. The system of claim 27, wherein the simulated friction information is updated to decrease friction associated with the first target.

29. The system of claim 27, wherein the simulated mass information is updated to decrease the simulated mass associated with the first target.

30. The system of claim 27, wherein the simulated spring tension information is updated to decrease the tension associated with the first target.

31. The system of claim 27, wherein the simulated inertia information is updated to decrease inertia associated with the first target.

32. The system of claim 27, wherein the simulated gravity information is decreased to decrease gravity associated with the first target.

33. The system of claim 27, wherein the simulated hardness information is increased to increase the hardness associated with the first target.

34. The system of claim 27, wherein the duration information is updated to increase the period of time that the first target is displayed on the display device.

35. The system of claim 27, wherein the step of updating the physics information includes using artificial intelligence.

36. The system of claim 27, wherein the step of generating the second alert includes generating a second tag indicating that the second image does not overlap the third image.

37. The system of claim 36, wherein the memory includes processor executable code that when executed by the one or more processor performs steps of:
generating, by the control system, a training set based on the first tag, the second tag, the first image information, the second image information, the third image information, the physics information, the acceleration information and the movement information; and
training a machine learning algorithm using the training set,
wherein the step of updating the physics information is performed in accordance with the machine learning algorithm.

38. The system of claim 36, wherein the memory includes processor executable code that when executed by the one or more processors executes steps of:
xii. obtaining, by the control device, user identification information associated with a first user associated with the first input device;
xiii. storing, by the control device, the user identification information in the memory;
xiv. generating, by the control device in the memory, session time information associated with a second period of time that the user uses the first control device;
xv. storing, by the control device in the memory, the session time information and associating the session time information with the user information;
xvi. storing, by the control device in the memory, the movement information and the second acceleration information and associating the movement information and the second acceleration information with the user identification information.

39. The system of claim 38, wherein the memory includes processor executable code that when executed by the one or more processors executes a step of storing, by the control device in the memory, at least one of the first tag and the second tag with the user identification information.

* * * * *